United States Patent
Kim et al.

(10) Patent No.: US 6,990,078 B2
(45) Date of Patent: Jan. 24, 2006

(54) METHOD FOR CONTROLLING THE TARGET BIT ERROR RATE OF EACH PACKET IN WIRED AND WIRELESS VIDEO COMMUNICATION SYSTEMS

(75) Inventors: Il Min Kim, Kyung Ki (KR); Hyung Myung Kim, Taejon (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 874 days.

(21) Appl. No.: 09/726,538

(22) Filed: Dec. 1, 2000

(65) Prior Publication Data

US 2001/0019589 A1    Sep. 6, 2001

(30) Foreign Application Priority Data

Feb. 21, 2000  (KR)  .................................. 2000-8265

(51) Int. Cl.
*H04L 1/00*     (2006.01)
(52) U.S. Cl. ..................................... 370/252; 370/465
(58) Field of Classification Search ................. 370/252, 370/465; 714/704
See application file for complete search history.

(56) References Cited

U.S. PATENT DOCUMENTS

2002/0040460 A1 *   4/2002   Choi et al. .................. 714/755

* cited by examiner

*Primary Examiner*—Melvin Marcelo
(74) *Attorney, Agent, or Firm*—Bacon & Thomas, PLLC

(57) ABSTRACT

A method of controlling the bit error rate of packets in a wired or wireless communication system controls differently the target bit error rate (BER) of a video packet depending on the state of importance after determining importance of the video information in the video packet by making the target BER of the important packet smaller and the target BER of the less important packet larger.

24 Claims, 1 Drawing Sheet

METHOD FOR CONTROLLING THE TARGET BIT ERROR RATE OF EACH PACKET IN WIRED AND WIRELESS VIDEO COMMUNICATION SYSTEMS

BACKGROUND OF THE INVENTION

1. Field of the Invention

The present invention relates to the wired and wireless video communication systems, and a method for controlling the target bit error rate of each packet in wired and wireless video communication systems which support efficiently a video service by controlling the target BER differently in each packet unit. Also, the present invention relates to a video transmission method in wired and wireless video communication systems, which adopts the said method for controlling the target BER. Voice and data services have been mainly served in communication service systems until present, but it is getting certain that video service will be a very important communication service system in the coming wired and wireless video communication systems like IMT-2000, etc.

2. Description of the Related Art

Most video coder such as MPEG, H.261, H.263 compress the video data using techniques such as discrete cosine transform (DCT), motion compensation (MC), variable length coding (VLC). Wherein, the representative example of the VLC is the Huffman code that allocates small number of bits to the often-occurring pattern in rate, and allocates many number of bits to the less-often-occurring pattern in rate, then reduce the total number of bits. However, resistance against the error becomes lower in case of compressing video data too much. In other words, if error occurs in a certain part of a video, a video decoder can't get the sync of the variable length code, and until the sync is acquired, the video data is got damaged. Additionally, the video distortion within a frame occurred by a channel error resulted is propagated into the further frames because the motion compensation is performed. Wherein, the distortion is defined as the mean square error (MSE) of difference between the originally inputted video into encoder and actually reconstructed in the decoder.

To get over the distortion in the video data due to the said channel error, many error concealment methods are suggested. The error concealment method reconstructs the damaged video area part using the receiving video information only. If this said method is used, although the original video can't be reconstructed perfectly, there is an advantage that can reconstruct the video distortion, which is occurred by the uncorrectable error with channel coding, in real time without increasing of transmission rate.

The error concealment method can be roughly grouped in two parts, a temporal concealment method and a spatial concealment one. In the spatial method, the video is reconstructed using a method like interpolation by using the surrounding video information. With using this method, there is an advantage that it is possible to reconstruct clean outlines of objects. However, there is a disadvantage that because it needs lots of calculating to embody, the complication of hardware is getting increased, and if the surrounding video information is damaged, a capability goes down a lot.

However, in the temporal concealment method, the damaged video area due to using motion vector is replaced with the motion compensated former frame area.

This method has an advantage that if there is no big motion change in the video, or if it is not a case which the video is composed too complicatedly, it shows a good capability. Also, it can be embodied comparative simply. The motion vector can be transmitted separately through a channel having comparatively low error occurring rate. In case not using the said channel, the motion vector of the damaged area can be assumed from the motion vector of the area without errors around the damaged video area. When all of the methods are impossible, zero vector can be used as a motion vector.

When encoded video data passes through the wired and wireless channels and is transmitted, a forward error correction (FEC) method is used in the actual communication system. The FEC method adds particular information on the transmission data and then corrects the errors by using the mentioned information at a receiving end when errors occur. In the conventional video communication systems, the same target of BER is given for all the packets of same kind of services such as telephone, conference through video communication network, and synchronized video service, etc. To satisfy this target of BER, in the conventional method, if other conditions are the same such as channel environment, etc., the FEC method is performed by using the same parameter of the FEC. In other words, the convolution coding and the turbo coding use the same code rate and the constraint length, and the BCH code and the lead Solomon code add the same amount of channel coding bit for each packet. After all, when the channel error rate passes through a constant channel, the BERs in the each packet become the same as all the video packets of the same kinds of services.

On the other hand, it is getting certain that for the 3rd generation mobile radio communication systems, the code division multiple access (CDMA) technique will be used. In the CDMA method, user's own code is allocated respectively to communicate. Many users use the same frequency band at the same time. So, the capacity of CDMA system is limited by the entire transmitted power which is received at or transmitted from the base center. Therefore, controlling the transmitted power in the CDMA system is very important and the lots of studies for it have been done. For example, in case of sending the data to the AWGN channel by using BPSK modulation, BER is given as below equation.

[Equation 1]

$$P_b \approx Q(\sqrt{\gamma}) = Q\left(\sqrt{\frac{W \cdot h(t) \cdot P(t)}{R(t) \cdot I(t)}}\right)$$

On the condition that $$Q(x) = \frac{1}{\sqrt{2\pi}} \int_x^\infty \exp(-y^2/2) dy$$

and $\gamma$ is energy per bit to interference plus noise density ratio (EINR), W is bandwidth of a channel, h(t) is path loss, P(t) is transmitted power of transmission, I(t) is interference transmitted power plus background noise transmitted power, and R(t) is data rate. It is possible that h(t) is changed due to moving of a mobile terminal, and R(t) or I(t) is changed due to changing of transmission rate in actual system. However, in the CDMA systems, power control is performed so that the BER of the received data is fixed by adjusting P(t). As shown at the equation 1, $\gamma$ and $P_b$ is not the function for time(t).

When the video information is sent in the conventional CDMA systems, if the services are the same kind of services such as video communication network telephone and conference, and synchronized video services, target BER of all the packets in the video sequence is chosen as the same value. To satisfy the mentioned target BER, power control is applied. So, with the same channel condition, the BER in the each packet becomes the same as all the video packet of the same kind of services.

As mentioned above, only with the same kind of services, the conventional system controls the target BER for all the packets in the video sequence and controlling transmitted power to maintain this target and performs the FEC to keep the value. But when the video data is transmitted to a channel on which noise exists, controlling the same target BER for all the video packets is not efficient due to the reason as follow. In case of that the packet is damaged during the video information is transmitted split in packet unit, the influence on the image quality is different depending on the characteristic of the video data which is stored in each packet. For example, even though a packet is damaged by channel error, if the packet includes the video information, which can be error concealed well at the decoder, the packet hardly influences on the image quality. On the contrary, if the packet, which includes the video information, which can not be error concealed well at the decoder, is damaged, a big distortion occurs on the video decoder and thus, this packet is more important compared to other packets. So, it is not efficient that controlling the same target BER for all the packets which support same kinds of services and keep that.

Also, in the conventional system, the target BER of each packet is controlled without concerning the number of the wireless channel through which the video packet passes. In other words, during communication, the packet passes through the wireless channel twice between two wireless ends, once between wireless end and wired end, and none between the wired ends. And in the conventional system, the same target BER is controlled without classifying the mentioned differences. But this method may provide too large target BER between two ends for a packet which passes many times through the wireless channel. And it may provide too small target BER between two ends for a packet which rarely passes or not through the wireless channel. Therefore, it is not desirable that controlling the same target BER in each channel without concerning the numbers of wireless channels which the video packet passes through.

SUMMARY OF THE INVENTION

The present inventions is contrived to solve the problem in the conventional system. The object of the present invention is to provide the method for controlling the target bit error rate of each packet in wired and wireless video communication systems, which increases the battery duration time with similar image quality without concerning the number of the wireless channels after controlling the target BER in the wired and wireless channels gradually depending on the number of wireless channels which each packets passes through, or depending on the importance of the information stored in the each packet.

DETAILED DESCRIPTION OF THE EMBODIMENTS

Figure 1:
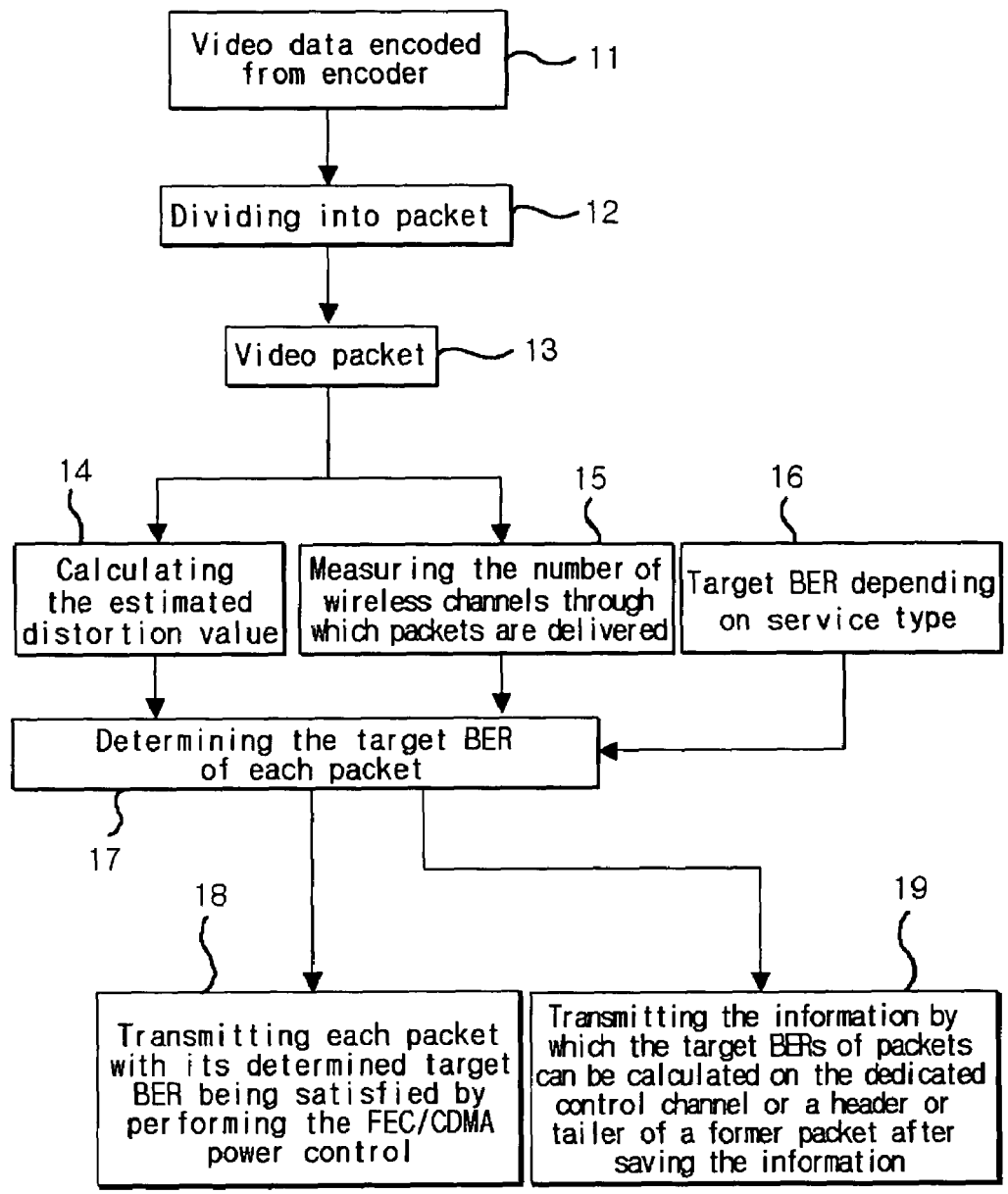
FIG. 1 is a flow-chart which shows a method for controlling the target bit error rate of each packet in wired and wireless video communication systems in accordance with an embodiment of the present invention.

To achieve above mentioned object, the method for controlling the target BER of each packet in wired and wireless video communication systems is characterized by controlling the above mentioned the target BER depending on the importance in the sense of the entire decoded image quality of the said video packet.

And the importance of the video packet is determined by at least one or more of the followings. One is the estimated distortion value which is occurred in spite of performing the error concealment for occurred error during transmission of the said video packet. And the other is the number of the wireless channel which the said video packet passes through.

Also, if the said estimated value of distortion is high, the video packet is determined as more importance, so thus the target for the BER is controlled small. Also, if the estimated value of distortion is low, the video packet is determined as less importance, so thus the target for the BER is controlled large.

Also, the BER of the video packet which passes through the wireless channel is controlled lower than the one which doesn't pass through the wireless channel. And, the BER of the video packet which more often passes through the wireless channel is controlled lower than the one which more less passes through the wireless channel.

Also, in accordance with the present invention, a transmission method of coded video data from communication systems to the receiving end has the following steps. At the 1st step, the said video data is divided into packet unit, and at the 2nd step, the target BER is controlled for the each said divided packet controls depending on the importance of the corresponding video packet for the entire decoded image quality. And at the 3rd step, the said video packet is managed to satisfy the target BER and is transmitted.

The importance of the video packet at the said 2nd step is determined by the estimated distortion value which is occurred in spite of performing the error concealment for the occurred error during transmission of the said video packet, or the number of the wireless channels which the said video packet passes through.

At the said 3rd step, to satisfy the target BER of the said video packet, the FEC method or transmitted power controlling method on the wireless channel area is used.

At the said 3rd step, if the target BER is small due to the high importance of the said video packet, the code rate of convolution coding and turbo coding becomes higher, or the constraint length becomes longer, and the more channel coding bit of Reed-Solomon code or BCH code is added.

Also, at the said 3rd step, if the importance of the said video packet is high, more transmitted power is allocated. Contrarily, if the importance of the said video packet is low, less transmitted power is allocated.

The target BER of each video packet such as mentioned above is stored in a header or a tailer of the former packet with video information of the said video packet and is transmitted to the receiving part.

Also, a recording medium which can be read by a computer on which the program is recorded for performing the video transmission method which includes above mentioned 3 steps.

Hereinafter, referring to appended drawings, 'the method for controlling the target BER of each packet in wired and wireless video communication systems and video transmission method' according to an embodiment of the present invention are described in detail as follow.

FIG. 1 is the operation flow chart for the method for controlling of the target BER in the wired and wireless video communication systems according to an embodiment of the present invention.

Referring to FIG. 1, the coded video data(11) from video encoder is divided into packet unit(12). The importance of this divided video packet(13) is determined before transmission through the channel. In the aspect of determining the importance of each packet, the present invention suggests the estimated distortion value(14) and the number of the wireless channels(15) which the said video packet passes through.

The estimated distortion value is the measure showing how the distortion is occurred when the receiving decoder performs the error concealment in case of error-occurring in a packet during transmitting. In the present invention, an error concealment operation is performed in advance before the transmitting encoder transmits the estimated distortion value into each video packet, and this estimated distortion value is defined as the measured distortion value. To measure this distortion value, a hardware performing the same error concealment function at the transmitting encoder as the function at the receiving decoder is installed. And also, the distortion, which is occurred by performing the error concealment function before each packet is transmitted, is measured. In case of difference of the error concealment depending on the receiving end type, a hardware has to be installed at the transmitting encoder, which can perform several error concealment method.

In other words, the transmitting encoder requests the information about error concealment method performed at the receiving decoder at the time of controlling to the very first or controlling an arc.

To measure the estimated distortion value without installing the hardware for the error concealment at the transmitting encoder, during not using the hardware for the error concealment in the transmitting decoder, the estimated distortion value of the packet coded in the transmitting encoder can be measured by using the said hardware in the transmitting decoder. However, this method has a disadvantage that the transmitting encoder can not use the hardware for the error concealment for measuring the estimated distortion value in case that a hardware for the error concealment of the transmitting decoder is used by the transmitting decoder. Also, if the error concealment method of the transmitting decoder is different from the one of the receiving decoder, there is a disadvantage that the estimated distortion value may not be the same as the distortion which actually occurs at the receiving decoder.

Also, as mentioned above, one of the standards for determining the importance of the packet is the number of the wireless channel through which the video packet passes. This number of the video packet's passing through the wireless channel is twice between wireless communication systems. And once between the wireless communication system and the wired communication system. And none between wired communication systems. Also, this number found from the first number of the telephone number which attempts to contact the telephone number of terminal. Generally, the BER of the wired channel is quite lower than the BER in the wireless channel. Therefore, the BER as the aspect of termination to termination can be changed largely depending on the transmission packet's number of the passing trough the wireless channel. In the present invention, to gain the decoded image quality as similar as possible at the receiving decoder, if other conditions are the same, the BER of a packet which passes twice through the wireless channel is controlled lower than the BER of a packet which passes once through the wireless channel in the wireless channel. And also, the BER of a packet which passes once through the wireless channel is controlled lower than the BER of a packet which never passes through the wireless channel in the wired channel.

As like this, the importance of each packet is determined by the 2 kinds of information, which are the estimated distortion value of packet(14), and the number of the wireless channel through which the video packet passes.(15) And this information is inputted as a determining block for the target BER of the packet. In this block, the target BER of each packet is determined(17) with considering the importance of each packet depending on the target BER(16) which varies upon the service. (for example, wireless video communication network telephone and conference, wireless VOD, wireless Web., Etc.)

If the service and the number of the wireless channel through which the video passes are the same, the packet with the high estimated distortion value is considered as more important, and the target BER of the packet is controlled smaller. Likewise, if the other conditions are the same, in the wireless channel, the target BER of a packet which passes twice through the wireless channel is controlled smaller than the one which passes once, and in the wired channel, the target BER of a packet which passes once through the wireless channel is controlled smaller than the one which never passes through the wireless channel area.

In the present invention, the FEC method is basically used to guarantee the determined target BER of each packet in the wired and wireless channels.(18) In other words, the code rate of the convolution coding or the turbo coding becomes higher, or the constraint length becomes longer for the important packet. And if the BCH code or Reed-Solomon code is used, the small target BER is guaranteed adding many channel coding bits on the important packet.

Also, in the CDMA wireless communication systems, open loop or close loop transmitted power controlling can be used to guarantee the target BER in the wireless channel. In other words, if other conditions such as course decrease, transmission rate, and interference are the same, more transmitted power is allocated for the important packet, and thus, the BER of the packet becomes low. And less transmitted power is allocated for the less important packet, and thus the BER of the packet becomes high.

The information about the target BER of each packet is transmitted with video information, and so, it can be informed to a switch or a router for the FEC of the wired channel and can be informed to a base station or a mobile station for the FEC or the transmitted power controlling of the wireless channel. (19) This information can be transmitted through the dedicated control channel, or transmitted through the header or tailer of a previous transmission packet.

Upon the present invention above described, in the aspect of the entire image quality, the target BER of the important video packet is controlled as small, and the one of less important video packet is controlled large. And thus, the forward error correction and using transmitted power is performed efficiently. Therefore, more user can be admitted in the limited bandwidth, and then, the efficiency of the bandwidth of wired and wireless channels can be heighten, and the battery can be lasted longer because in a wireless CDMA system, each mobile station uses transmitted power efficiently.

In addition, the target BER of the video packet which passes often through the wireless channels is controlled smaller than the target BER which passes rarely or less often through the wireless channel area. So, regardless of the number of the wireless channel through which a corresponding video packet passes, the receiving decoder can obtain the constant decoded image quality.

What is claimed is:

1. A method for controlling the target bit error rate of each packet in wired and wireless video communication systems, which controls the target BER of the said video packet depending on the importance of the entire decoded image quality of the said video packet.

2. The method of claim 1 wherein the said importance of the video packet is determined by at least one of the following:
   (1) estimated distortion value, which is estimated even though the error concealment of the error occurred during transmitting of said video packet, and
   (2) the number of the wireless channel through which the said video packet passes.

3. The method of claim 2 wherein the target BER is controlled small after determining the video packet as having high importance if the said estimated distortion value is high, and
   the target BER is controlled large after determining the video packet as having low importance, if the said estimated distortion value is low.

4. The method of claim 3 wherein a transmitting encoder estimates the estimated distortion value of the said video packet as performing the error concealment function for the said video packet to be transmitted.

5. The method of claim 2 wherein a hardware which performs the same error function as a receiving decoder specially prepared at a transmitting encoder estimates the estimated distortion value of said video packet.

6. The method of claim 3 wherein a hardware which performs the same error function as a receiving decoder specially prepared at a transmitting encoder estimates the estimated distortion value of said video packet.

7. The method of claim 4 wherein a hardware which performs the same error function as a receiving decoder specially prepared at a transmitting encoder estimates the estimated distortion value of said video packet.

8. The method of claim 2, wherein a hardware which performs the error concealment function installed on a transmitting decoder estimates the estimated distortion value of said video packet.

9. The method of claim 3, wherein a hardware which performs the error concealment function installed on a transmitting decoder estimates the estimated distortion value of said video packet.

10. The method of claim 4, wherein a hardware which performs the error concealment function installed on a transmitting decoder estimates the estimated distortion value of said video packet.

11. The method of claim 2 wherein the target BER of said video packet which passes more often through said wireless channel is controlled smaller in the wireless channel compared to the target BER which does not pass through the wireless channel.

12. The method of claim 3 wherein the target BER of said video packet which passes more often through said wireless channel is controlled smaller in the wireless channel compared to the target BER which passes less often through the wireless channel.

13. The method of claim 4 wherein the target BER of said video packet which passes more often through said wireless channel is controlled smaller in the wireless channel compared to the target BER which passes less often through the wireless channel.

14. A method wherein a transmitting part transmits coded video data to a receiving part in wired and wireless video communication systems, which comprises the steps of:
   (1) dividing the said video data into video packets,
   (2) controlling the target BER for each said video packet depending on the importance of the corresponding video packet for the entire decoded image quality, and
   (3) managing each said video packet to satisfy the target BER and transmitting the video packets.

15. The method of claim 14 wherein the said importance of the video packet at the said $2^{nd}$ step is determined by at least one of the following:
   (1) estimated distortion value, which estimates the occurred distortion even though the error concealment for the error occurred during transmitting of said video packet, and
   (2) the number of the wireless channel through which the said video packet passes.

16. The method of claim 15 wherein the target BER is controlled small after determining the video packet as having high importance if the said estimated distortion value is high, and
   the target BER is controlled large after determining the video packet as having low importance, if the said estimated distortion value is low.

17. The method of claim 15 wherein the target BER of the video packet which passes through the said wireless channel is controlled smaller in the wired channel compared to the target BER which does not pass the through the wireless channel, and
   the target BER of the video packet which passes more often through the said wireless channel is controlled smaller in the wireless channel compared to the target BER which passes less often through the wireless channel.

18. The method for the $3^{rd}$ step of claim 14 wherein the FEC method is used to satisfy the target BER of said video packet.

19. The method for the $3^{rd}$ step of claim 18 wherein a constraint length is extended or a code rate of a convolution coding or turbo coding is made high if the target BER is small due to high importance of the said video packet.

20. The method for the $3^{rd}$ step of claim 18 wherein many channel coding bits of Reed-Solomon code or BCH code are added if the target BER is small due to high importance of said video packet.

21. The method for the $3^{rd}$ step of claim 14 wherein a method for controlling transmitted power in the wireless channel area is used to satisfy the target BER of said video packet.

22. The method for the $3^{rd}$ step of claim 21 wherein the transmitted power is allocated as follows:
   (1) allocating high transmitted power if the importance of said video packet is high, and (2) allocating lower transmitted power if the importance of said video packet is low.

23. The method of claim 14 wherein the said video packet is transmitted with the information by which the target BER of the said video packet can be calculated.

24. A recording medium which can be read by a computer on which a program is recorded for performing a video transmission method which comprises the steps of:

(1) dividing video data into video packets,
(2) controlling the target BER for each said video packet depending on the importance of the corresponding video packet for the entire decoded image quality, and
(3) managing each said video packet to satisfy the target BER and transmitting the video packets.

* * * * *